(12) United States Patent
Oki

(10) Patent No.: US 10,681,239 B2
(45) Date of Patent: Jun. 9, 2020

(54) IMAGE FORMING APPARATUS FOR EMBEDDING ERROR DETECTION INFORMATION WITHIN A SCANNED IMAGE

(71) Applicant: KONICA MINOLTA, INC., Chiyoda-ku, Tokyo (JP)

(72) Inventor: Makoto Oki, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/523,749

(22) Filed: Jul. 26, 2019

(65) Prior Publication Data

US 2019/0349496 A1 Nov. 14, 2019

Related U.S. Application Data

(63) Continuation of application No. 15/015,815, filed on Feb. 4, 2016, now Pat. No. 10,397,433.

(30) Foreign Application Priority Data

Feb. 6, 2015 (JP) .................. 2015-021729

(51) Int. Cl.
*H04N 1/00* (2006.01)
*H04N 1/047* (2006.01)

(52) U.S. Cl.
CPC ... *H04N 1/047* (2013.01); *H04N 2201/04715* (2013.01); *H04N 2201/04743* (2013.01)

(58) Field of Classification Search
CPC .............................. G06F 3/1207; G06F 3/1273
See application file for complete search history.

(56) References Cited

U.S. PATENT DOCUMENTS

2004/0114796 A1* 6/2004 Kaku .................... G06T 7/0002
382/165
2008/0212136 A1 9/2008 Namikata
(Continued)

FOREIGN PATENT DOCUMENTS

JP 2000-029198 A 1/2000
JP 2004-280514 A 10/2004
(Continued)

OTHER PUBLICATIONS

Notification of Reasons for Refusal issued by the Japanese Patent Office dated May 30, 2017 in corresponding JP Application No. 2015-021729, with full English translation (11 pages).
(Continued)

*Primary Examiner* — Benjamin O Dulaney
(74) *Attorney, Agent, or Firm* — Buchanan Ingersoll & Rooney PC

(57) ABSTRACT

An image forming apparatus includes an image forming unit, an image reading unit, an image inspecting unit and a history generating unit. The image forming unit forms an image on a sheet. The image reading unit reads a sheet face on which the image is formed, thereby generating a scan image. The image inspecting unit compares the generated scan image with a normal image to detect an error in the scan image. When the image inspecting unit detects the error, the history generating unit generates detection information on the detected error and embeds the generated detection information in the scan image, thereby generating a history image.

20 Claims, 13 Drawing Sheets

(56) References Cited

U.S. PATENT DOCUMENTS

| | | | |
|---|---|---|---|
| 2009/0003646 A1* | 1/2009 | Au | H04N 1/32144 382/100 |
| 2009/0041370 A1 | 2/2009 | Wu et al. | |
| 2009/0190182 A1 | 7/2009 | Ishikawa et al. | |
| 2010/0061635 A1 | 3/2010 | Ihara | |
| 2011/0052010 A1 | 3/2011 | Xu et al. | |
| 2011/0233852 A1 | 9/2011 | Ikarashi | |
| 2012/0019852 A1 | 1/2012 | Ito | |
| 2012/0233542 A1 | 9/2012 | Funakoshi | |
| 2012/0327450 A1 | 12/2012 | Sagan et al. | |
| 2013/0021633 A1 | 1/2013 | Atsumi et al. | |
| 2013/0050767 A1 | 2/2013 | Stuart et al. | |
| 2014/0146370 A1 | 5/2014 | Banner et al. | |
| 2014/0270397 A1 | 9/2014 | Sochi | |
| 2014/0293363 A1* | 10/2014 | Hiramatsu | B41J 29/46 358/406 |
| 2015/0370519 A1* | 12/2015 | Tachi | G06F 3/1273 358/1.15 |
| 2016/0105586 A1 | 4/2016 | Oki | |
| 2016/0124690 A1* | 5/2016 | Kimura | G06F 3/1241 358/1.15 |

FOREIGN PATENT DOCUMENTS

| | | |
|---|---|---|
| JP | 2009-288974 A | 12/2009 |
| JP | 2011-150599 A | 8/2011 |
| JP | 2012-025064 A | 2/2012 |

OTHER PUBLICATIONS

Notification of Reasons for Refusal issued by the Japanese Patent Office dated Mar. 10, 2017 in corresponding JP Application No. 2015-021729, with full English translation (11 pages).
Chinese Office Action dated Dec. 6, 2017 in corresponding Chinese Patent Application 201610075895.4, with English translation.

\* cited by examiner

IMAGE FORMING APPARATUS FOR EMBEDDING ERROR DETECTION INFORMATION WITHIN A SCANNED IMAGE

FIELD OF THE INVENTION

The present invention relates to an image forming apparatus and a history generating method.

DESCRIPTION OF THE RELATED ART

Conventionally, after forms an image on a sheet, an image forming apparatus compares a scan image obtained by reading the sheet face on which the image is formed with its normal image, which has been inspected, to detect errors such as stains, color shift errors, position shift errors and the like.

When an error is detected, a difference between the scan image and the normal image is displayed, whereby a user can confirm the image region where the error is detected. (Refer to, for example, Japanese Patent Application Publication No. 2000-29198.)

However, in order to perform such display, a dedicated application which can calculate the difference between the scan image and the normal image is required, and hence user-friendliness is low.

As to text (character) images, by utilizing an art of embedding PDF texts, a general application for creation of and reference to PDF files can be used to place and display a normal text image on a read text image. (Refer to, for example, Japanese Patent Application Publication Nos. 2009-288974, 2004-280514 and 2011-150599.)

However, images formed by an image forming apparatus are not limited to text images but include, for example, graphics images and picture images. However, there have been no measures to provide detection information on errors detected in text images as well as in the other images, the detection information indicating positions, sizes, types, levels and the like of the detected errors, in an easily confirmable form by use of a general application.

BRIEF SUMMARY OF THE INVENTION

Objects of the present invention include providing a history image which makes it easy to confirm error detection information.

In order to achieve at least one of the above objects, according to an aspect of the present invention, there is provided An image forming apparatus including: an image forming unit which forms an image on a sheet; an image reading unit which reads a sheet face on which the image is formed, thereby generating a scan image; an image inspecting unit which compares the generated scan image with a normal image to detect an error in the scan image; and a history generating unit which, when the image inspecting unit detects the error, generates detection information on the detected error and embeds the generated detection information in the scan image, thereby generating a history image.

Preferably, in the image forming apparatus, the history generating unit generates an error name text of a name of the error as the detection information and embeds the generated error name text in one or more rectangular regions containing an error-detected image region, where the error is detected.

Preferably, in the image forming apparatus, the name is composed of one of or any combination of (i) a type, (ii) an identification number and (iii) a level of the error.

Preferably, in the image forming apparatus, the history generating unit determines one rectangular region circumscribing the error-detected image region as a text embedment region, where the error name text is to be embedded, and determines a format and a layout of the error name text such that a size of the text embedment region agrees with a size of the error name text when embedded in the text embedment region.

Preferably, in the image forming apparatus, the history generating unit determines one or more rectangular regions placed over the error-detected image region as one or more text embedment regions, where the error name text is to be embedded, and determines a format and a layout of the error name text such that a size or sizes of the one or more text embedment regions agrees with a size of the error name text when embedded in the one or more text embedment regions.

Preferably, in the image forming apparatus, the error name text has a transparent color.

Preferably, in the image forming apparatus, the history generating unit generates a bookmark using the error name text and embeds the generated bookmark in the scan image.

Preferably, in the image forming apparatus, the history generating unit generates an image clearly showing an error-detected image region, where the error is detected, as the detection information and embeds the generated image in the scan image as a layer different from a layer of the scan image.

Preferably, in the image forming apparatus, the history generating unit generates, as the image clearly showing the error-detected image region, at least one of (i) an image accentuating the error-detected image region and (ii) an image of the error-detected image region placed on the normal image.

Preferably, in the image forming apparatus, the image inspecting unit detects the error of at least one type among an image defect, a color shift and a position shift.

BRIEF DESCRIPTION OF THE SEVERAL VIEWS OF THE DRAWING

The present invention is fully understood from the detailed description given hereinafter and the accompanying drawings, which are given byway of illustration only and thus are not intended to limit the present invention, wherein.

DETAILED DESCRIPTION OF THE INVENTION

Figure 1:
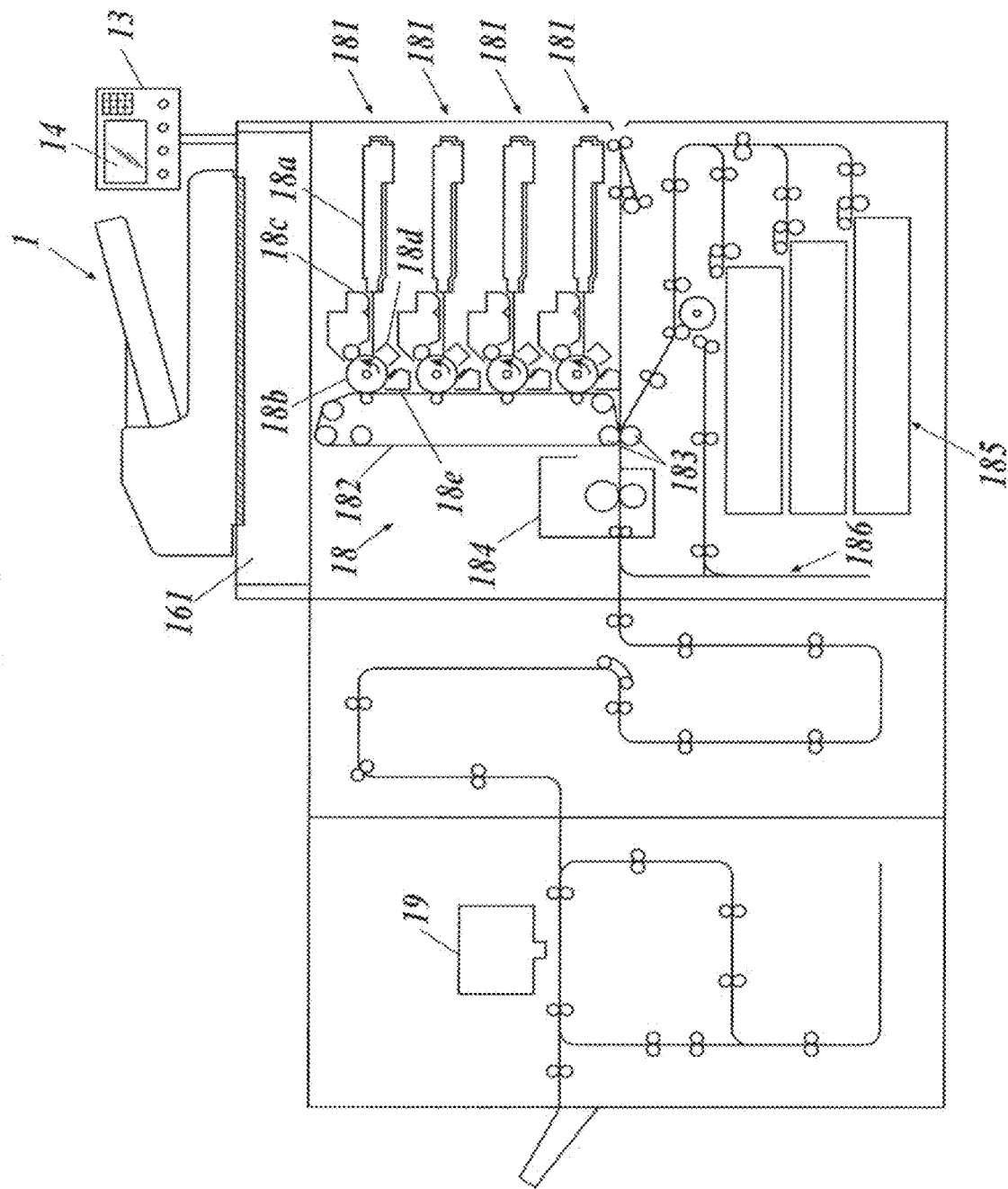
FIG. 1 is a front view showing the configuration of an image forming apparatus according to an embodiment of the present invention.

Hereinafter, an embodiment of an image forming apparatus and a history generating method of the preset invention is described, referring to the drawings.

FIG. 1 schematically shows the configuration of an image forming apparatus 1 according to an embodiment of the present invention.

As shown in FIG. 1, the image forming apparatus 1 includes an image forming unit 18 and forms with the image forming unit 18 images based on bitmap initial images on sheets of paper with color materials such as toners.

The image forming apparatus 1 also includes an image reading unit 19 on a paper conveyance path on the downstream side of the image forming unit 18. The image forming apparatus 1 reads with the image reading unit 19 sheet faces on which images are formed, thereby generating scan images, and carries out inspection to detect errors, such as stains, color shift errors and the like, in the generated scan images.

Figure 2:
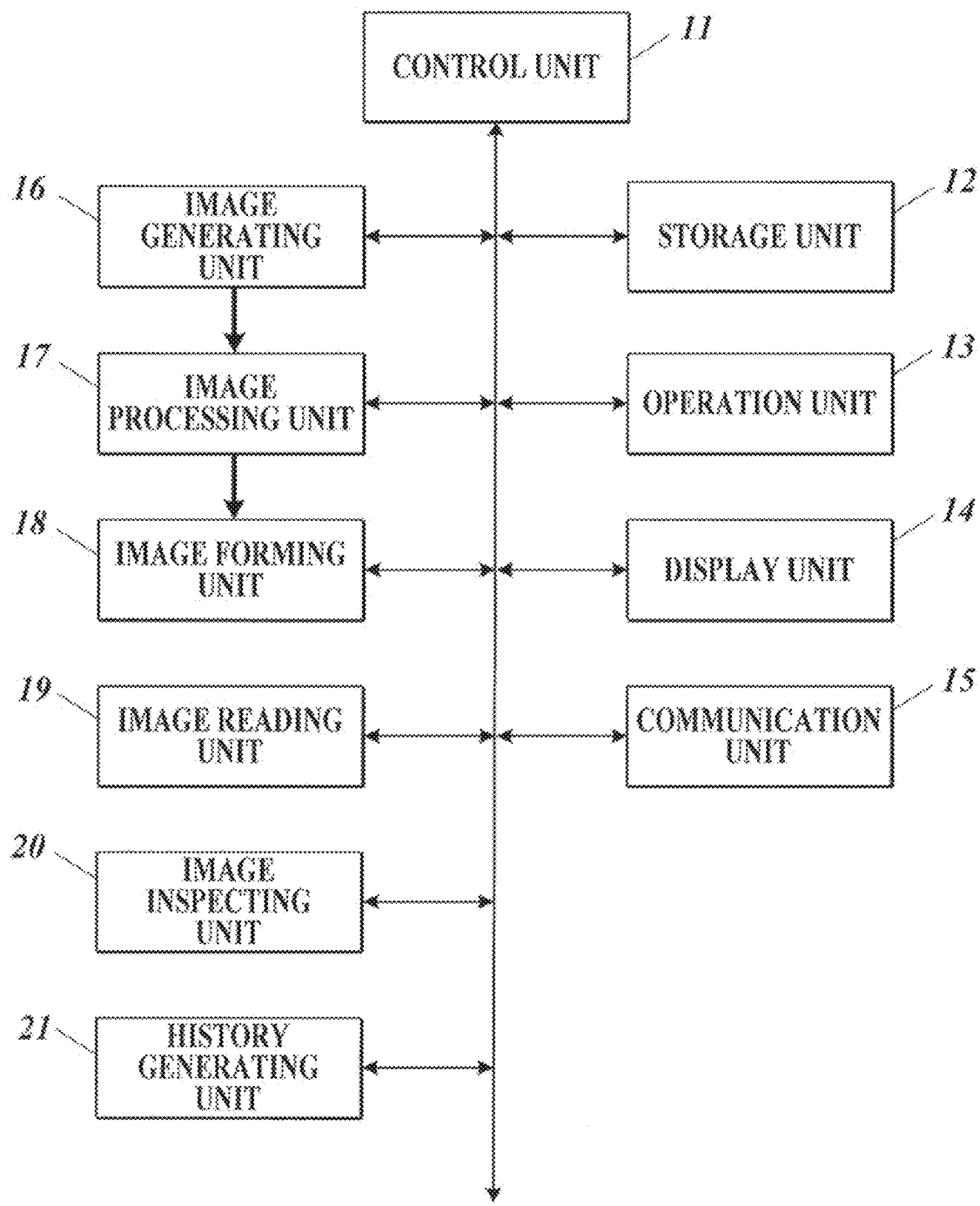
FIG. 2 is a block diagram showing, by function, components of the image forming apparatus shown in FIG. 1.

FIG. 2 shows, by function, components of the image forming apparatus 1.

As shown in FIG. 2, the image forming apparatus 1 includes a control unit 11, a storage unit 12, an operation unit 13, a display unit 14, a communication unit 15, an image generating unit 16, an image processing unit 17, an image forming unit 18 (described above), an image reading unit 19 (described above), an image inspecting unit 20 and a history generating unit 21.

The control unit 11 reads programs stored in the storage unit 12 and executes the programs, thereby controlling the units and the like of the image forming apparatus 1. The control unit 11 includes a CPU (Central Processing Unit) and a RAM (Random Access Memory).

The control unit 11 allows the image processing unit 17 to process (i.e. to perform image processing on) the initial images generated by the image generating unit 16 and allows the image forming unit 18 to form images based on the processed initial images on sheets of paper, for example.

The control unit 11 also allows the image forming unit 18 to form an image for color shift error detection and an image for position shift error detection, which are respectively for calibration and correction of position shift errors. As to initial images of these, the control unit 11 may generate the initial images or may read the initial images which are generated in advance and stored in the storage unit 12.

The storage unit 12 stores therein programs readable by the control unit 11, data used for execution of the programs and the like. As the storage unit 12, a mass memory such as a hard disk can be used.

The storage unit 12 also stores therein scan images generated by the image reading unit 19, images for histories (history images) generated by the history generating unit 21 and the like.

The operation unit 13 and the display unit 14 are, as shown in FIG. 1, disposed at the upper part of the image forming apparatus 1 as a user interface.

The operation unit 13 generates operation signals corresponding to user operations and outputs the signals to the control unit 11. As the operation unit 13, keys or a touchscreen integrated with the display unit 14 can be used, for example.

The display unit 14 displays an operation screen and the like, following instructions from the control unit 11. As the display unit 14, an LCD (Liquid Crystal Display), an OELD (Organic Electro Luminescence Display) or the like can be used.

The communication unit 15 communicates with external apparatuses on a network, such as a user terminal, a server and another image forming apparatus (i.e. an image forming apparatus other than the image forming apparatus 1).

The communication unit 15 receives data (PDL data) described in a page description language (PDL) from a user terminal via the network, for example. The communication unit 15 can send history images to external apparatuses via the network.

The image generating unit 16 generates bitmap initial images by color, namely, C (cyan), M (magenta), Y (yellow) and K (black), by rasterizing the PDL data received by the communication unit 15. The pixels of each initial image have their respective gradation values. The gradation values are data values representing tone of the image. For example, 8-bit data values represent the tone in 0 to 255 gradations, respectively.

The image generating unit 16 can also generate the initial images by reading with an image reading unit 161 images on documents set by users. The image reading unit 161 is disposed at the upper part of the image forming apparatus 1 as shown in FIG. 1.

The image processing unit 17 performs image processing which is exemplified by gradation processing and halftone processing on the initial images generated by the image generating unit 16.

The gradation processing is processing to convert (correct) gradation values of pixels of an initial image into gradation values with which density characteristics of an image formed on a sheet match target density characteristics.

The halftone processing is exemplified by error diffusion and screening employing ordered dithering.

The image forming unit 18 forms an image composed of multiple colors (C, M, Y and K) on a sheet according to gradation values of pixels of the initial images processed by the image processing unit 17.

The image forming unit 18 includes, as shown in FIG. 1, four writing units 181, an intermediate transfer belt 182, a pair of secondary transfer rollers 183, a fixing device 184, paper feed trays 185 and a reversal mechanism 186. The writing units 181 are disposed in series along the belt surface of the intermediate transfer belt 182. The intermediate transfer belt 182 rotates by being wounded around a plurality of rollers. One of the rollers is one of the secondary transfer rollers 183. The secondary transfer rollers 183 and the fixing device 184 are disposed on the paper conveyance path for paper carried from the paper feed trays 185. The paper feed trays 185 each house sheets of paper.

The four writing units 181 form C, M, Y and K images, respectively. The writing units 181 are the same in configuration, and each of them includes an exposure unit 18*a*, a photoreceptor 18*b*, a developing unit 18*c*, a charger 18*d* and a cleaner 18*e*.

In each writing unit 181, the charger 18*d* applies a voltage to the photoreceptor 18*b*, thereby charging the photoreceptor 18*b*, the exposure unit 18*a* irradiates the photoreceptor 18*b* with laser beams according to gradation values of pixels of a C, M, Y or K image, thereby exposing the photoreceptor 18*b*, and then the developing unit 18*c* supplies a color (C, M, Y or K) material such as a toner to develop an electrostatic latent image formed on the photoreceptor 18*b*, thereby forming the C, M, Y or K image on the photoreceptor 18*b*.

The C, M, Y and K images formed on the respective photoreceptors 18*b* are successively transferred onto the intermediate transfer belt 182 in such a way as to be superimposed on top of each other, whereby an image composed of multiple colors (C, M, Y and K) is formed on the intermediate transfer belt 182. After the C, M, Y and K images are transferred thereonto, the cleaners 18*e* of the writing units 181 remove the color materials remaining on the respective photoreceptors 18*b*.

When a sheet is supplied from any one of the paper feed trays 185 and the image composed of the multiple colors on the intermediate transfer belt 182 is transferred onto the sheet by the secondary transfer rollers 183, the fixing device 184 heats and presses the sheet, thereby fixing the image to the sheet. In the case where the image is formed on both sides of the sheet, the sheet is reversed by the reversal mechanism 186 and carried to the secondary transfer rollers 183 again.

As shown in FIG. 1, the image reading unit 19 is a line sensor, an area sensor or the like disposed on the paper conveyance path. The image reading unit 19 reads the sheet face having the image formed by the image forming unit 18, thereby generating a bitmap scan image.

The scan image generated by the image reading unit 19 is transferred to the storage unit 12 via an image transfer path employing an interface such as PCI express.

The image inspecting unit 20 compares the scan image generated by the image reading unit 19 with its normal image to detect errors in the scan image. As the normal image, usable are the initial images and a scan image of a sheet determined as having no errors by a user who inspects a plurality of sheets on which the image is formed.

Types of errors detectable by the image inspecting unit 20 include an image defect ("defect" hereinafter), a color shift and a position shift. The image inspecting unit 20 detects errors of at least one type among these types.

For defect error detection, the image inspecting unit 20 compares a scan image with its normal image and detects a defect error(s), such as streaks, wrinkles, stains, image errata and image disappearances, in the scan image. For example, the image inspecting unit 20 determines a feature point of a scan image and its normal image, calculates a feature amount of the feature point, determines whether or not the scan image and the normal image are similar to each other based on the feature amount with a discriminant analysis method, and when determines that the scan image and the normal image are dissimilar from each other based on the feature amount, detects the feature point in the scan image as an image region where a defect error occurs (i.e. an error-detected image region).

For color shift error detection, the image inspecting unit 20 compares a scan image with its normal image and detects an image region(s) in the scan image, the image region being different in gradation value from its corresponding image region in the normal image, as an image region where a color shift error occurs (i.e. an error-detected image region). The image inspecting unit 20 calculates a difference between a gradation value of a scan image and a gradation value, which serves as a reference value, of its normal image as a color shift amount. In the case where an image for color shift error detection is formed for calibration, the image inspecting unit 20 may detect a color shift error(s) in a scan image of this image. The image for color shift error detection to use is exemplified by an image of a color chart composed of patches having different gradation values of the primary colors (C, M, Y and K), the secondary colors (mixed colors of the primary colors) and the like.

For position shift error detection, the image inspecting unit 20 compares a scan image with its normal image and detects an image region(s) in the scan image, the image region being different in position from its corresponding image region in the normal image, as an image region where a position shift error occurs (i.e. an error-detected image region). In the case where an image for position shift error detection is formed for correction of position shift errors, the image inspecting unit 20 may detect a position shift error(s) in a scan image of this image. The image for color shift error detection to use is exemplified by an image of a cross called the register mark. The image inspecting unit 20 compares the image for color shift error detection in a scan image with that in its normal image in terms of position and detects the image region of the image in the scan image as an image region where a position shift error occurs when the image in the scan image and the image in the normal image are different from each other in position. More specifically, the image inspecting unit 20 compares, for example, an image of a register mark in a scan image with that in its normal image in terms of distance from the edge of a sheet to the image of the register mark and detects the image region of the register mark in the scan image as an image region where a position shift error occurs when the image in the scan image and the image in the normal image are different from each other in the distance. The image inspecting unit 20 calculates a difference between the position of the image for position shift error detection in the scan image and the position thereof in the normal image as a position shift amount.

The history generating unit 21 generates a history image using the scan image generated by the image reading unit 19. The history image is evidence that image formation has been performed and can be utilized for inspection, confirmation and the like of a printed matter obtained by the image formation.

When the image inspecting unit 20 detects an error, the history generating unit 21 generates detection information on the detected error and embeds the generated detection information in the scan mage, thereby generating a history image. The history generating unit 21 stores the generated history image in the storage unit 12, but may store the history image in an external apparatus on a network through the communication unit 15.

The image inspecting unit 20 and the history generating unit 21 may be composed of hardware resources such as LSIs (Large Scale Integrations). Software processing by a computer such as a CPU reading and executing a program(s) for image inspection and history image generation can realize the same processing content as the hardware resources.

Figure 3:
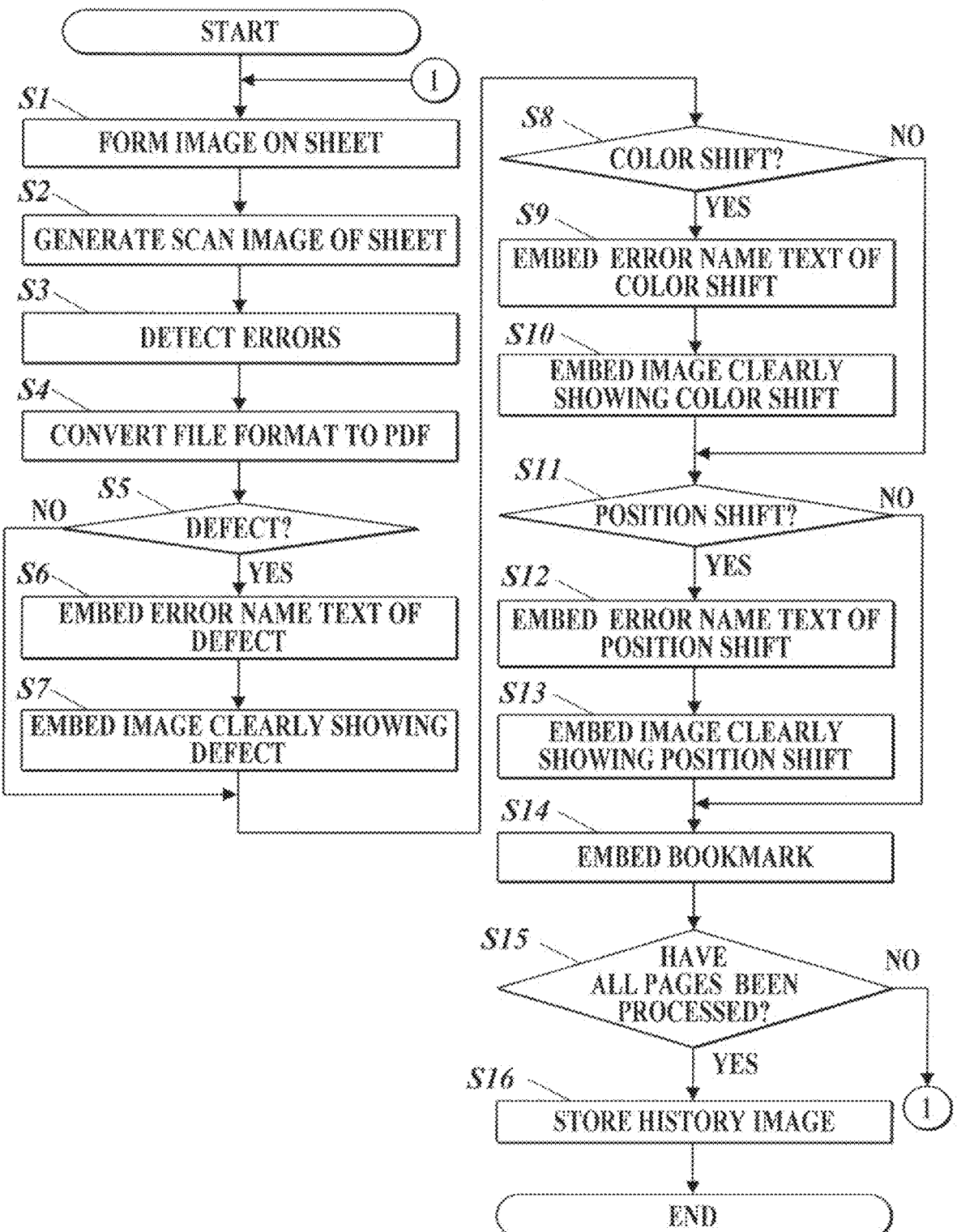
FIG. 3 is a flowchart showing a procedure taken by the image forming apparatus to generate a history image(s)

FIG. 3 shows a procedure taken by the image forming apparatus 1 to generate a history image(s).

As shown in FIG. 3, in the image forming apparatus 1, the image forming unit 18 forms an image of one page on a sheet (Step S1).

The image reading unit 19 reads the sheet face on which the image is formed, thereby generating a scan image (Step S2). The image inspecting unit 20 compares the scan image generated by the image reading unit 19 with its normal image to detect errors in the scan image (Step S3).

The history generating unit 21 converts the file format of the scan image generated by the image reading unit 19 from the bitmap format to PDF (Step S4). If the image inspecting unit 20 detects no errors (Step S5; NO, Step S8; NO, and Step S11; NO), a history image of one page is obtained through the conversion of the file format to PDF.

On the other hand, if the image inspecting unit 20 detects a defect error (Step S5; YES), the history generating unit 21 generates an error name text for the defect error as detection information on the defect error. The history generating unit 21 embeds the generated error name text in one or more rectangular regions containing the error-detected image region, where the defect error is detected in the scan image (Step S6).

Because the file format is PDF, tools of note annotation and text annotation prepared in an application for creation of PDF files can be utilized to embed the error name text. The note annotation is a tool to add a text to any region on a page, whereas the text annotation is a tool to add emending instructions to replace a text with another, add a text, change paragraphs on a page and the like.

The name of an error (i.e. an error name) is preferably composed of one of or any combination of (i) a type, (ii) an identification number and (iii) a level of the error, so that retrieval of the error name text (i.e. the error) can be easy.

The identification number is, for example, a page number indicating a page where the error is detected and/or a detection number indicating what number the error is in order of detected errors in the page. The level is, for example, the color shift amount or the position shift amount calculated by the image inspecting unit 20.

It is further preferable that the type, identification number and/or level be combined with a piece(s) of information with which a printed matter as an inspection target is identifiable, such as a serial number of an image forming apparatus which has formed the image, the name of a job for the image formation and a file name of the initial images, so that retrieval of the error can be easier.

For example, the defect error name text "JobA_p4err001" is generated by combining the text "JobA" indicating that the job name is A, the text "p4" indicating that the error-detected page is page 4, the text "err" indicating that the error type is the defect, and the text "001" indicating that the error is the first detected in the page.

The history generating unit 21 can determine one rectangular region circumscribing the error-detected image region, where the defect error is detected, as a text embedment region, where the error name text is to be embedded, and determine the format and layout of the error name text such that the size of the text embedment region agrees with the size of the error name text when embedded in the text embedment region.

Figure 4A:
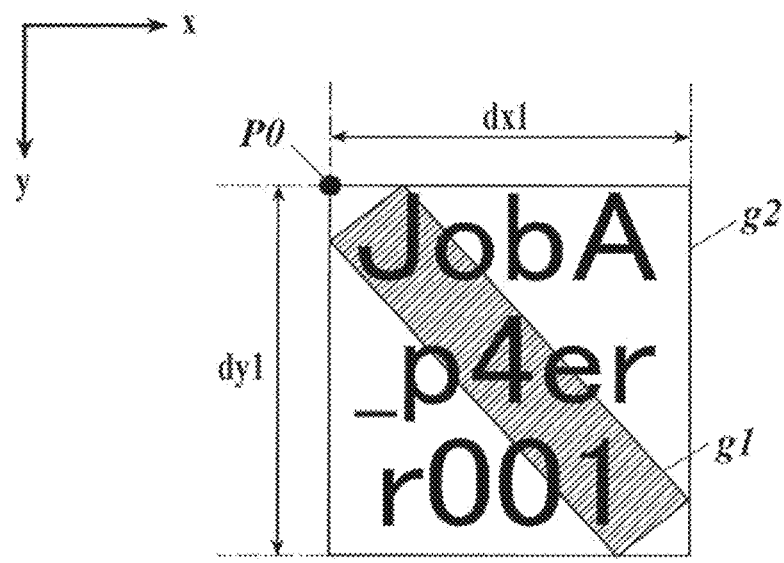
FIG. 4A shows one rectangular region circumscribing an error-detected image region, where an error is detected.

FIG. 4A shows, as a text embedment region, one rectangular region g2 circumscribing an image region g1 where an oblique line-shaped stain is detected.

In this case, the start point P0 of the rectangular region g2 can be determined as the position of the text embedment region, and the width dx1 in the main scanning direction x and the width dy1 in the sub scanning direction y of the rectangular region g2 can be determined as the size of the text embedment region.

The format and layout of the error name text "JobAYp4err001" can be determined such that the size of the rectangular region g2 agrees with the size of the error name text "JobAYp4err001" when embedded in the rectangular region g2. Examples of the format include font size, character spacing and line spacing, and examples of the layout include the number of rows in the rectangular region g2 and the number of characters in a row in the rectangular region g2.

The history generating unit 21 can alternatively determine one or more rectangular regions placed over the error-detected image region, where the defect error is detected, as one or more text embedment regions and determine the format and layout of the error name text such that the size or the sizes of the one or more text embedment regions agree with the size of the error name text when embedded in the one or more text embedment regions.

Figure 4B:
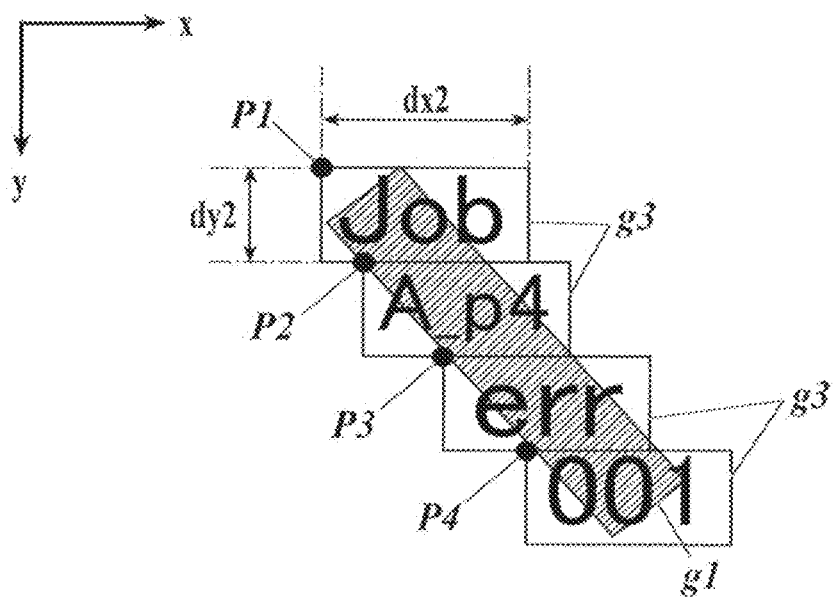
FIG. 4B shows four rectangular regions having the same size and placed over the error-detected image region.

FIG. 4B shows four rectangular regions g3 having the same size and placed over the image region g1, where an oblique line-shaped stain is detected, as text embedment regions.

In this case, the start points P1 to P4 of the respective rectangular regions g3 can be determined as the positions of the text embedment regions, respectively, and the widths dx2 in the main scanning direction x and the widths dy2 in the sub scanning direction y of the respective rectangular regions g3 can be determined as the sizes of the text embedment regions, respectively.

The format and layout of the error name text "JobAYp4err001" can be determined such that the sizes of the rectangular regions g3 agree with the size of the error name text "JobAYp4err001" when embedded in the rectangular regions g3. Examples of the format include font size, character spacing and line spacing, and examples of the layout include the number of characters arranged in each rectangular region g3 and the number of rows in each rectangular region g3.

The history generating unit 21 can also adjust the arrangement direction, angle, aspect ratio and the like of characters as the format and layout of the error name text.

Figure 5A:
FIG. 5A shows an example of an error name text composed of characters in vertical writing.

For example, FIG. 4A and FIG. 4B each show an example of characters arranged from left to right, namely, in horizontal writing, but when a text embedment region is a vertically long and narrow rectangular, such as a text embedment region g4 shown in FIG. 5A, the characters may be arranged from top to bottom, namely, in vertical writing, one by one.

Figure 5B:
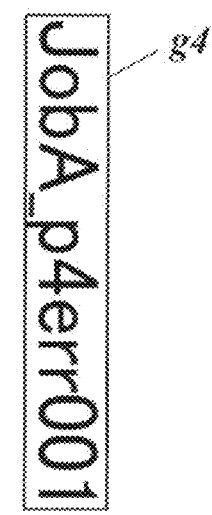
FIG. 5B shows an example of the error name text with the angle of the characters adjusted.

FIG. 5B shows an example of the characters in vertical writing being rotated 90°.

Figure 5C:
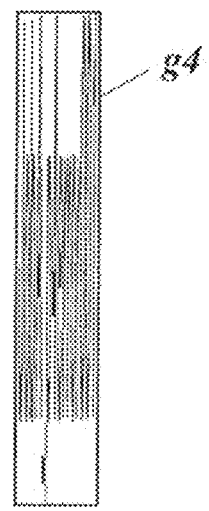
FIG. 5C shows an example of the error name text with the angle and aspect ratio of the characters adjusted.

FIG. 5C shows an example of the characters shown in FIG. 5B being arranged from left to right one by one with the aspect ratio of the characters adjusted to agree with the size of the text embedment region g4.

The error name text to embed preferably has a transparent color, so that even if the error name text embedded in the scan image is displayed when the scan mage is displayed, the scan image is confirmable (i.e. seeable).

When embeds the error name text (Step S6), the history generating unit 21 extracts, from the scan image, the error-detected image region, where the defect error is detected, and generates, as the detection information on the defect error, an image clearly showing the extracted error-detected image region. As long as the image clearly shows the error-detected image region, it may be an image clearly showing a rectangular region(s) generated by extracting one or more rectangular regions containing the error-detected image region, like the text embedment region(s). The history generating unit 21 embeds the generated image in the scan image as a layer different from the layer of the scan image (Step S7).

The image clearly showing the error-detected image region is at least one of (i) an image accentuating the error-detected image region, thereby being more noticeable than the other region, by hatching, brightness inversion or the like and (ii) an image of the error-detected image region placed on the normal image at a position corresponding to the position of the error-detected image region in the scan image. Either of the images makes it easy to grasp the error-detected image region.

In the case of the above (ii) image, namely, the image of the error-detected image region placed on the normal image, if the normal image and the image of the error-detected image region are embedded in the scan image as different layers, this makes it easier to grasp the error-detected image region because display switching of these images becomes available.

Figure 6A:
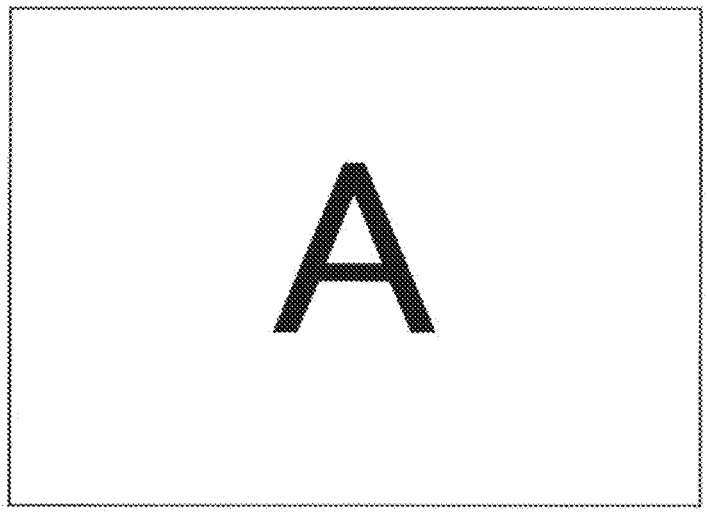
FIG. 6A shows an example of a normal image.
Figure 6B:
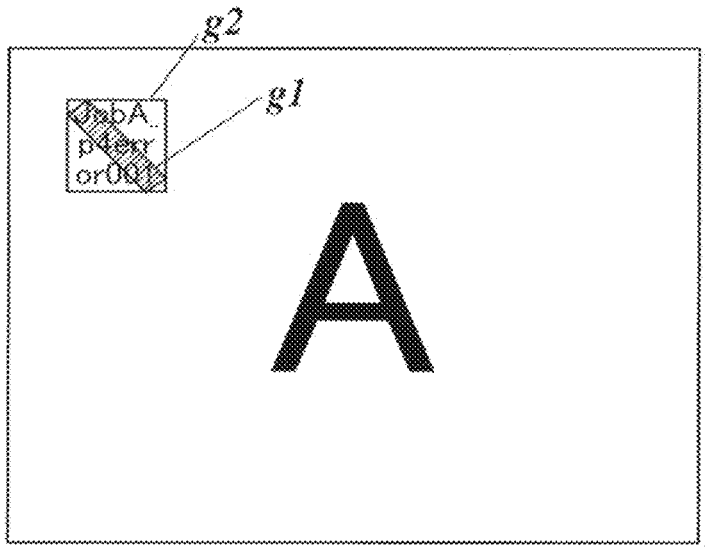
FIG. 6B shows an example of a scan image where an error name text is embedded.

FIG. 6A shows an example of a normal image. FIG. 6B shows an example of a scan image where a stain (defect error) is detected and an error name text thereof is embedded in one rectangular region g2 circumscribing an error-detected image region g1, where the stain is detected.

Figure 6C:
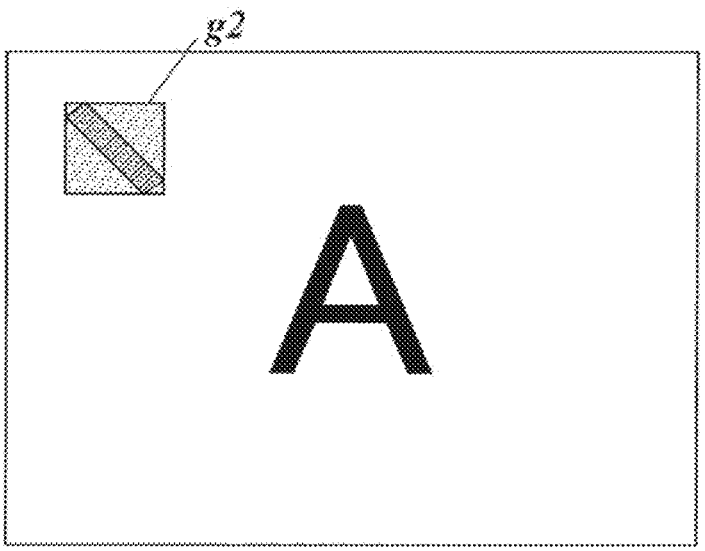
FIG. 6C shows an example of the normal image where an image clearly showing an error-detected image region is embedded.

FIG. 6C shows an example of an image clearly showing an error-detected image region. The image shown in FIG. 6C is an image generated by: extracting, as the error-detected image region, the rectangular region g2, where the error name text is embedded, from the scan image shown in FIG. 6B; placing the rectangular region g2 on the normal image shown in FIG. 6A at a position corresponding to the position of the rectangular region g2 in the scan image; and accentuating the rectangular region g2.

In the above, the procedure is described to embed detection information on a defect error. However, the same procedure is used to embed detection information on a color shift error and a position shift error.

If the image inspecting unit 20 detects a color shift error (Step S8), the history generating unit 21 generates an error name text for the color shift error. The history generating unit embeds the generated error name text in one or more rectangular regions containing the error-detected image region, where the color shift error is detected in the scan image (Step S9), in the same way as the defect error.

Then, the history generating unit 21 generates an image clearly showing the error-detected image region, where the color shift error is detected, and embeds the generated image in the scan image as a layer different from the layer of the scan image (Step S10).

Figure 7:
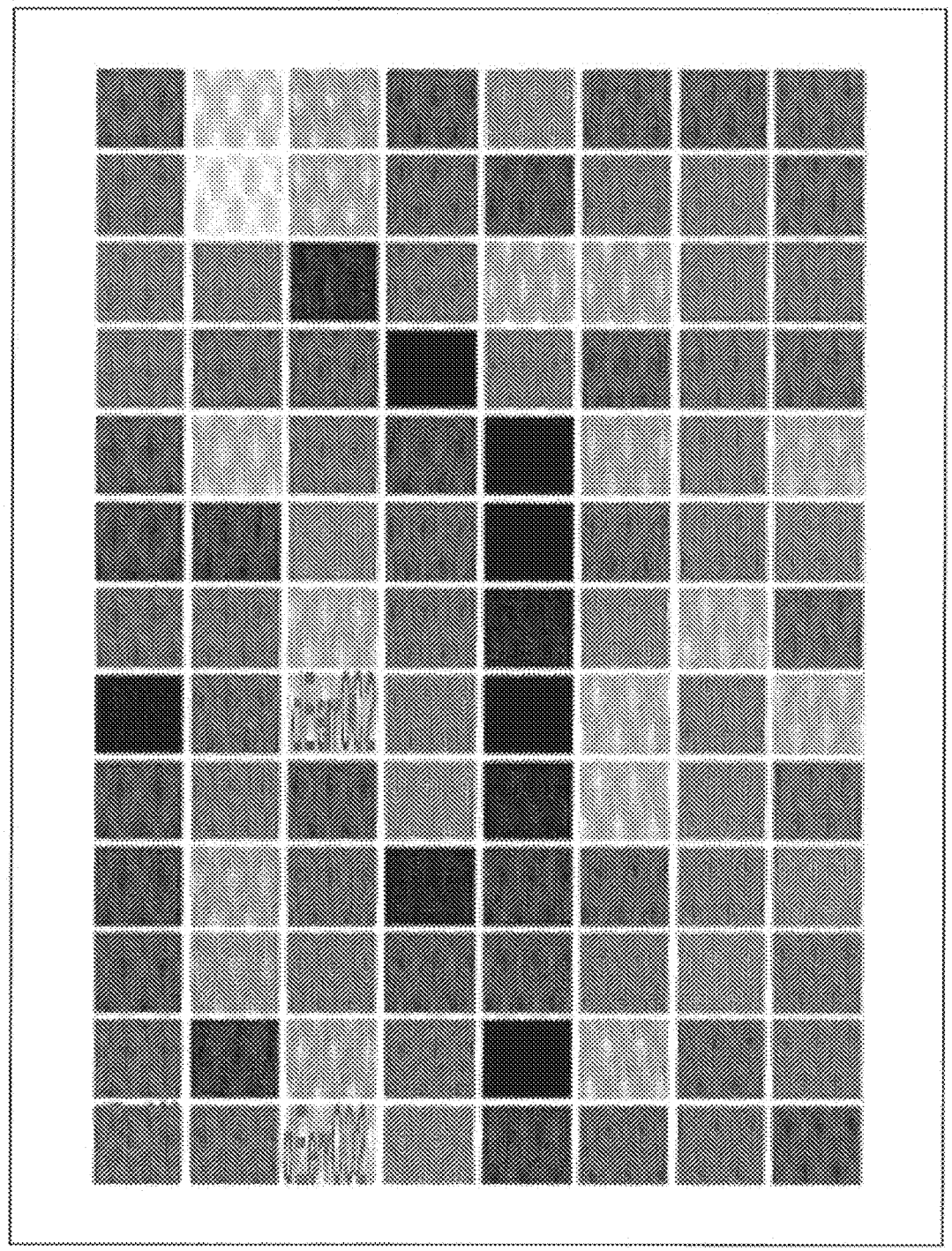
FIG. 7 shows an example of a color chart where an error name text(s) is embedded.

FIG. 7 shows an example of a scan image of a color chart formed on a sheet for color shift error detection. In the scan image, an error name text(s) of color shift errors is embedded.

As shown in FIG. 7, the error name text(s) of the color shift errors is embedded in the image regions of patches where the color shift errors occur. The error name text(s) of the color shift errors is generated by combining the text "dEerr" indicating that the error type is the color shift and a text of a number indicating the color shift amount. For example, the error name text "dEerr002" indicates that a color shift error is detected, and the color shift amount thereof is level 2.

If the image inspecting unit 20 detects a position shift error (Step S11; YES), the history generating unit 21 generates an error name text for the position shift error. The history generating unit 21 embeds the generated error name text in one or more rectangular regions containing the error-detected image region, where the position shift error is detected in the scan image (Step S12), in the same way as the defect error.

Then, the history generating unit 21 generates an image clearly showing the error-detected image region, where the position shift error is detected, and embeds the generated image in the scan image as a layer different from the layer of the scan image (Step S13).

Figure 8:
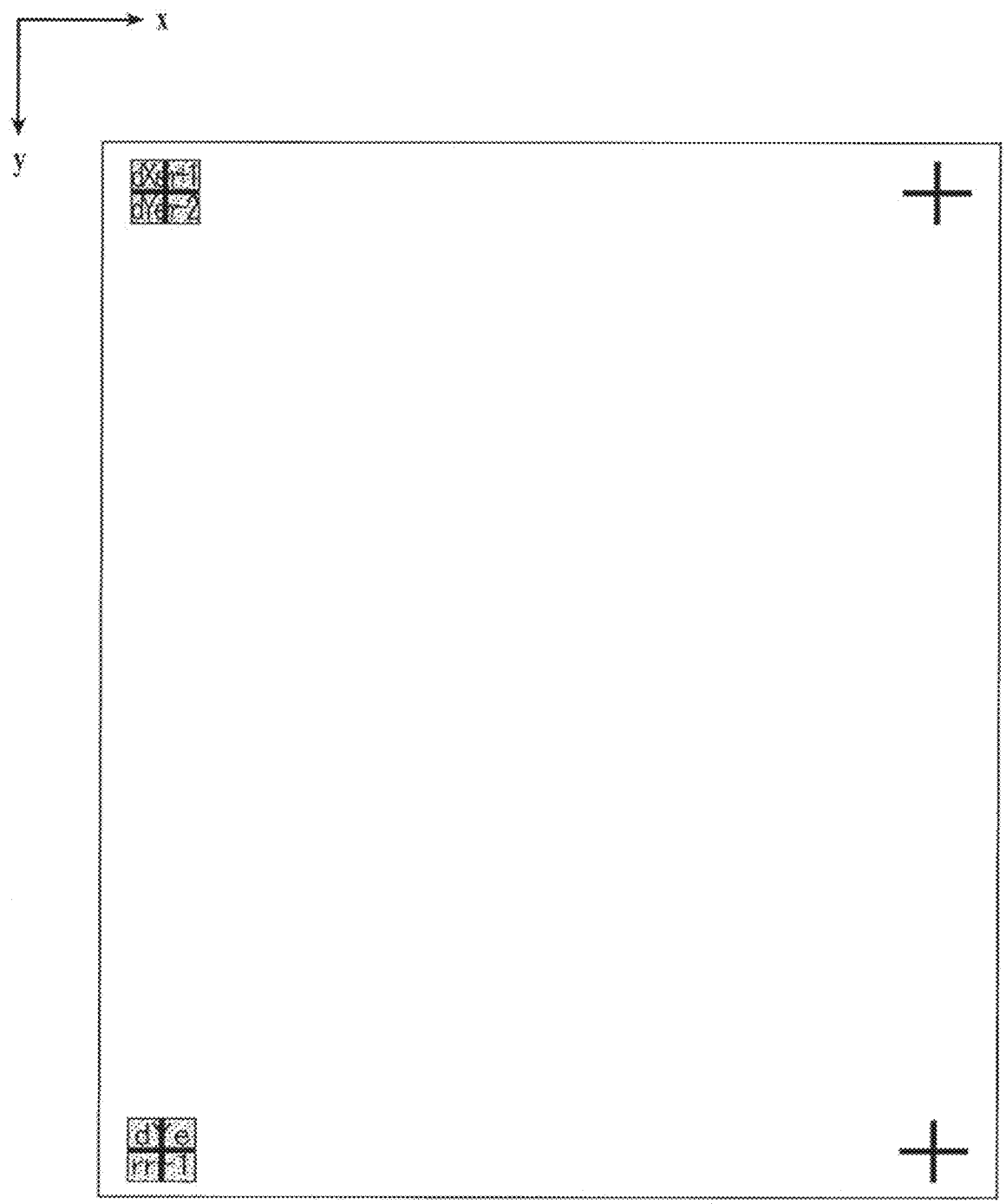
FIG. 8 shows examples of register marks where error name texts and images clearly showing error-detected image regions are embedded.

FIG. 8 shows examples of scan images of four register marks formed on a sheet for position shift error detection. In the scan images, error name texts of position shift errors are embedded.

As shown in FIG. 8, the error name texts of the position shift errors are embedded in the image regions of, among four register marks, two register marks where the position shift errors occur. Each of the error name texts of the position shift errors is generated by combining the text "dXerr" indicating that the error type is the position shift in the main scanning direction x or "dYerr" indicating that the error type is the position shift in the sub scanning direction y and a text of a sign and a number indicating the position shift amount. For example, the error name text "dXerr+1" in FIG. 8 indicates that the position of the register mark in the scan image is shifted +1 mm to the end side in the main scanning direction x from the position of its corresponding register mark in the normal image.

As shown in FIG. 8, as an image clearly showing the error-detected image region, where the color shift error is detected, an image accentuating the rectangular region circumscribing the register mark is embedded.

When the detection information on each of all the errors is embedded, the history generating unit 21 generates a bookmark using the error name texts as indexes and embeds the generated bookmark in the scan image (Step S14). A history image of one page is obtained through the embedment of the bookmark.

In the bookmark, the error name texts can be described hierarchically with their error types, and also links to pages where the error name texts are embedded can be described.

When no errors are detected, a bookmark indicating that the number of detected errors is 0 may be generated and embedded in the scan image.

After the history image of one page is generated, if history images of all the pages have not been generated yet (Step S15; NO), the process returns to Step S1 to generate a history image of the next page. On the other hand, if history images of all the pages have been generated (Step S15; YES), the history generating unit 21 combines the history images of all the pages so as to store the history images as a history image of one job in the storage unit 12 (Step S16).

The stored history image makes it easy to retrieve the errors detected by the image inspecting unit 20 using the error name texts embedded in the history image. The file format of the history image is PDF. Therefore, the errors can be easily retrieved by utilizing a general application for reading PDF files, such as Acrobat®.

The bookmark embedded in the history image can be read and displayed, for example.

Figure 9:
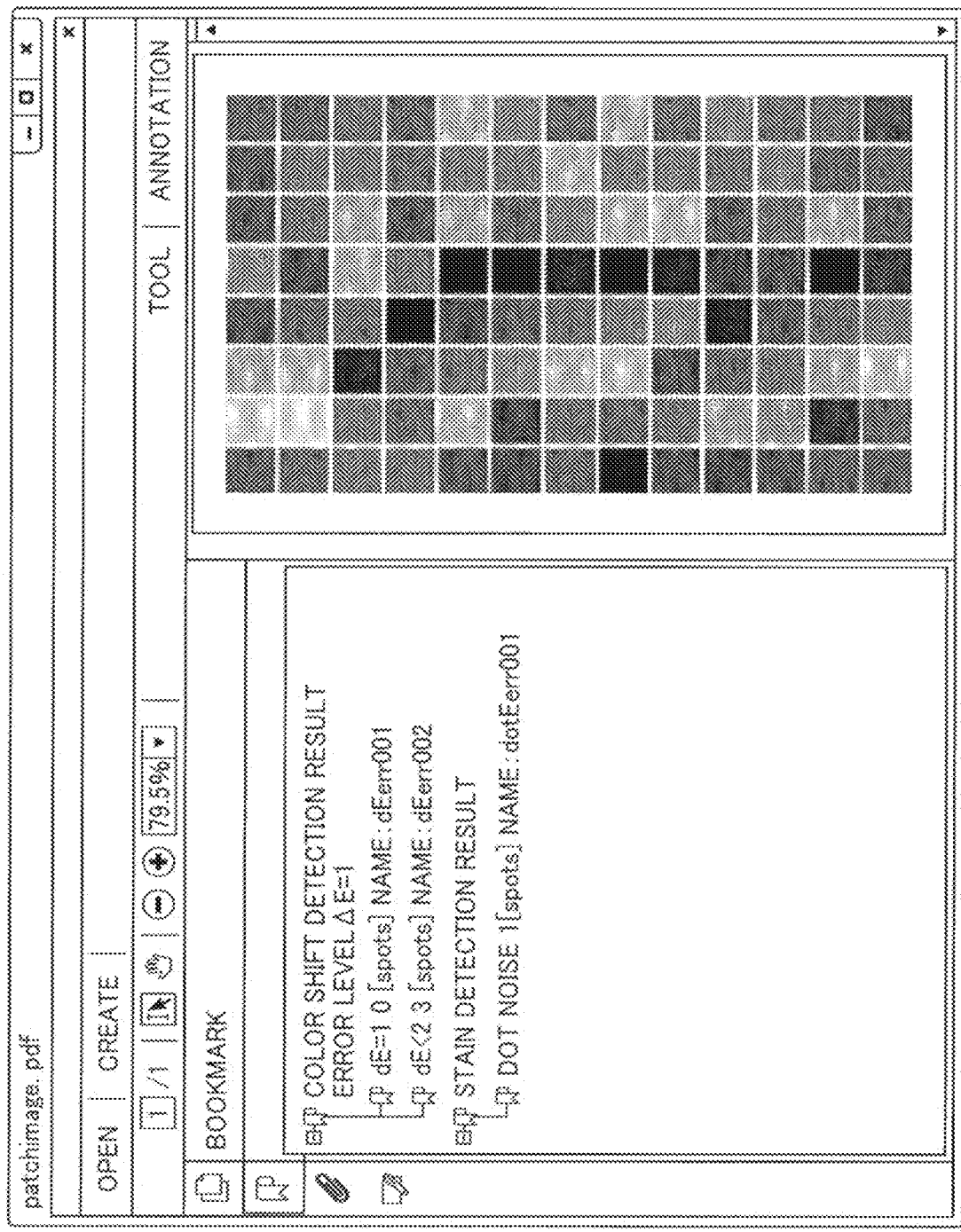
FIG. 9 shows an example of a display screen displaying a bookmark.

FIG. 9 shows an example of a display screen displaying the bookmark.

As shown in FIG. 9, the display screen is divided into left and right sections. On the left section of the display screen, the bookmark is displayed. In the bookmark, the detected errors, such as color shift errors and stains (defect errors), are displayed hierarchically with their error types, using their error name texts as indexes. On the right section of the display screen, the scan image of a page can be displayed, the page where an error name text selected from among the indexes is embedded.

This bookmark makes them possible to grasp the whole picture of the error detection result and also to jump, of a plurality of pages, to a page where a specified error(s) is detected, and therefore makes it easy to confirm errors.

Further, the image clearly showing an error-detected image region, the image being embedded in the history image, can be read and displayed. If both the above (i) image, namely, the image accentuating an error-detected image region, and the above (ii) image, namely, the image of the error-detected image region placed on a normal image, are embedded as the image clearly showing the error-detected image region, display switching of (a) the normal image, (b) the image of the error-detected image region placed on the normal image, (c) the scan image, and (d) the scan image with the image of the error-detected image region placed becomes available.

Figure 10A:
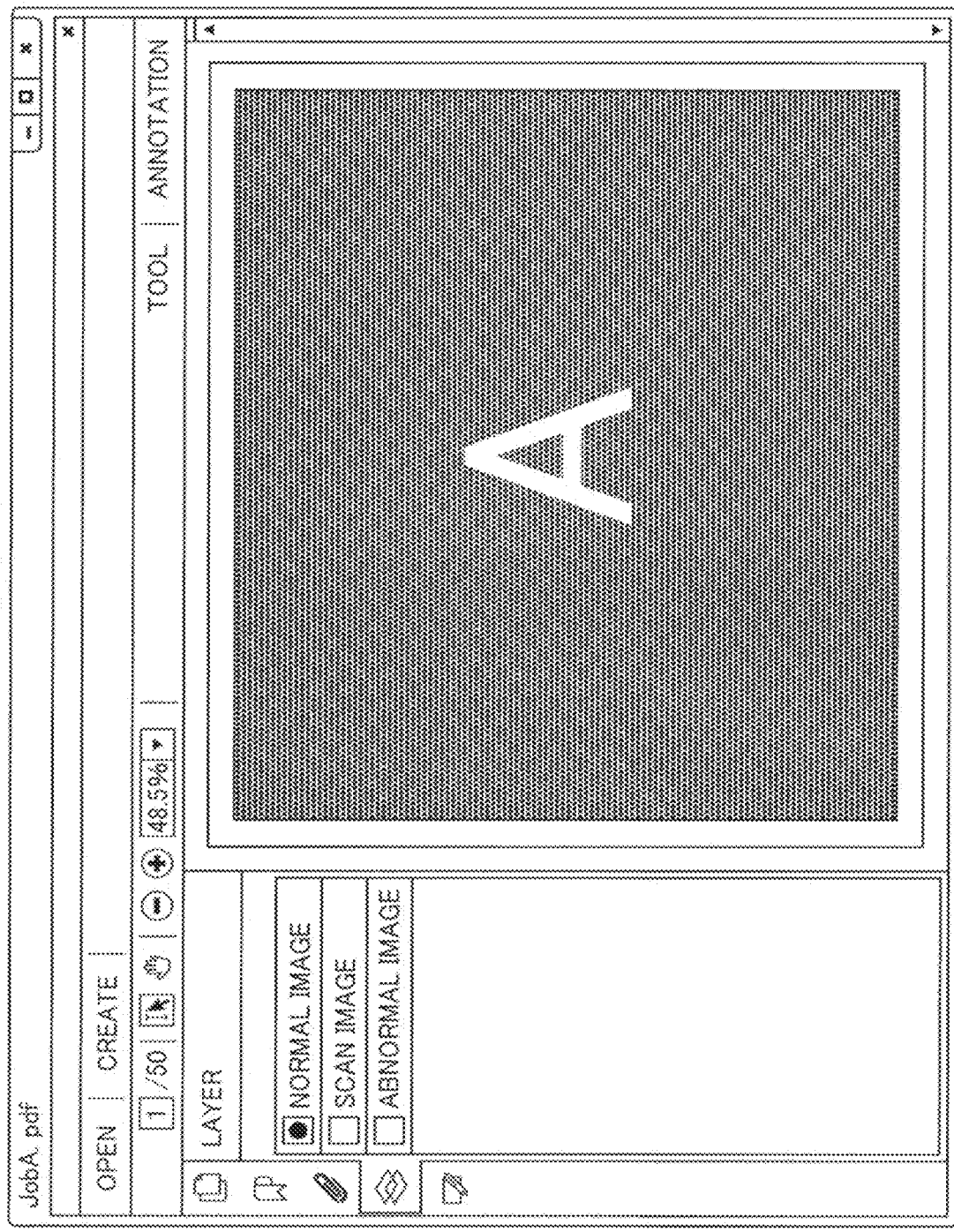
FIG. 10A shows an example of a display screen displaying a normal image.
Figure 10B:
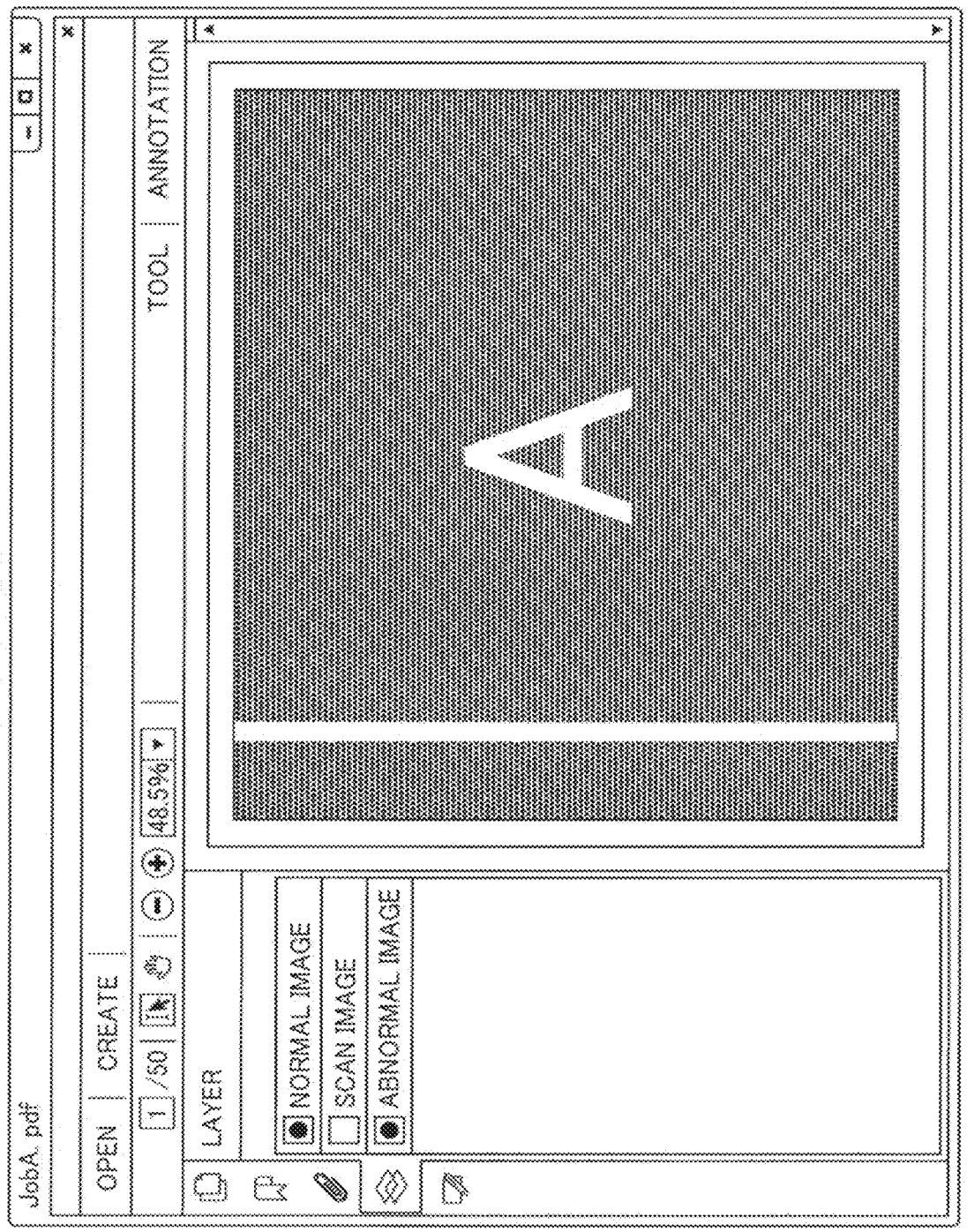
FIG. 10B shows an example of the display screen displaying the normal image with an error-detected image region placed.
Figure 10C:
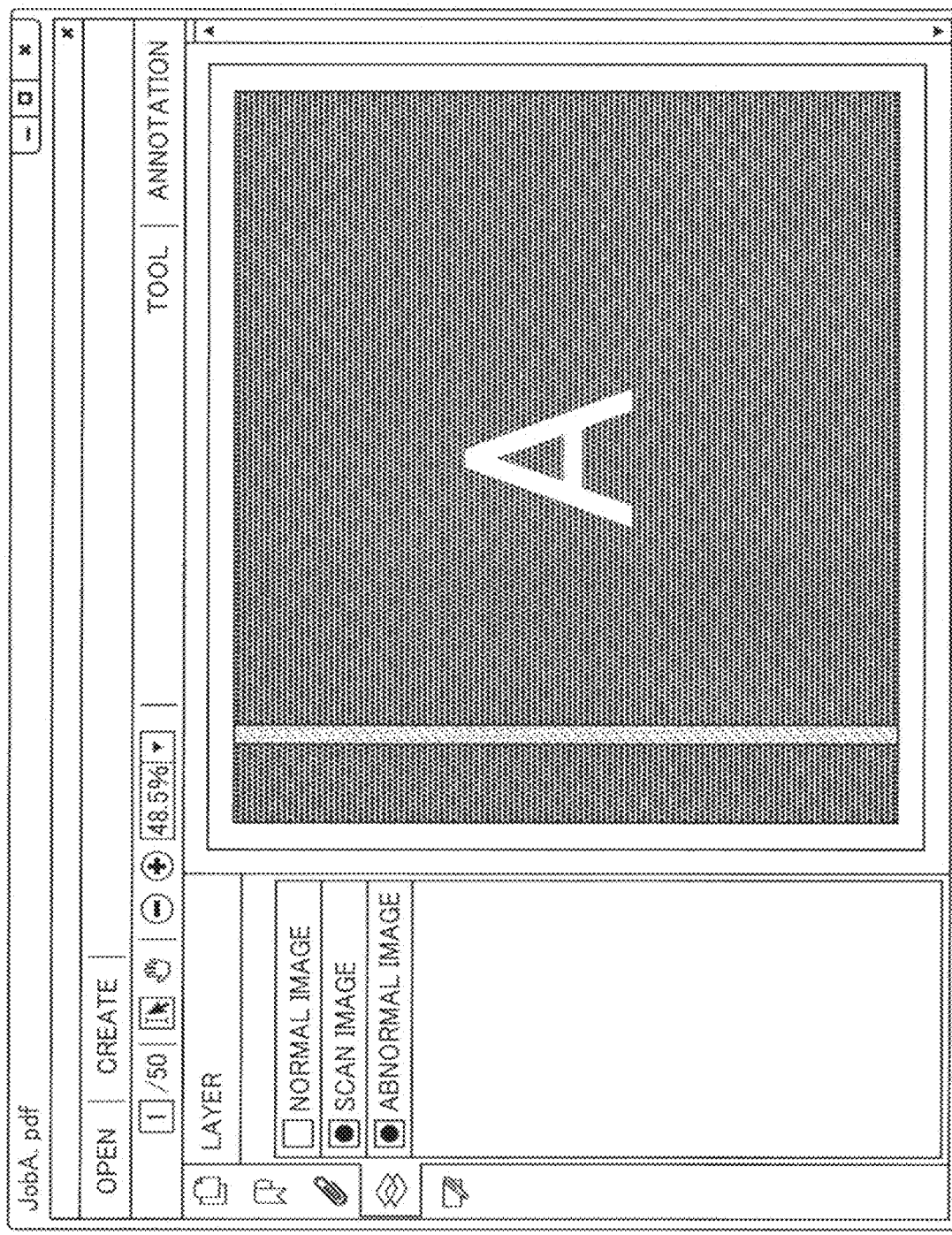
FIG. 10C shows an example of the display screen displaying a scan image with an image accentuating the error-detected image region placed.

FIG. 10A shows an example of a display screen displaying a normal image. FIG. 10B shows an example of the display screen displaying the normal image with an error-detected image region placed. FIG. 10C shows an example of the display screen displaying a scan image with an image accentuating the error-detected image region placed. Display switching of these images makes it easy to confirm the white streak in the scan image.

Figure 10D:
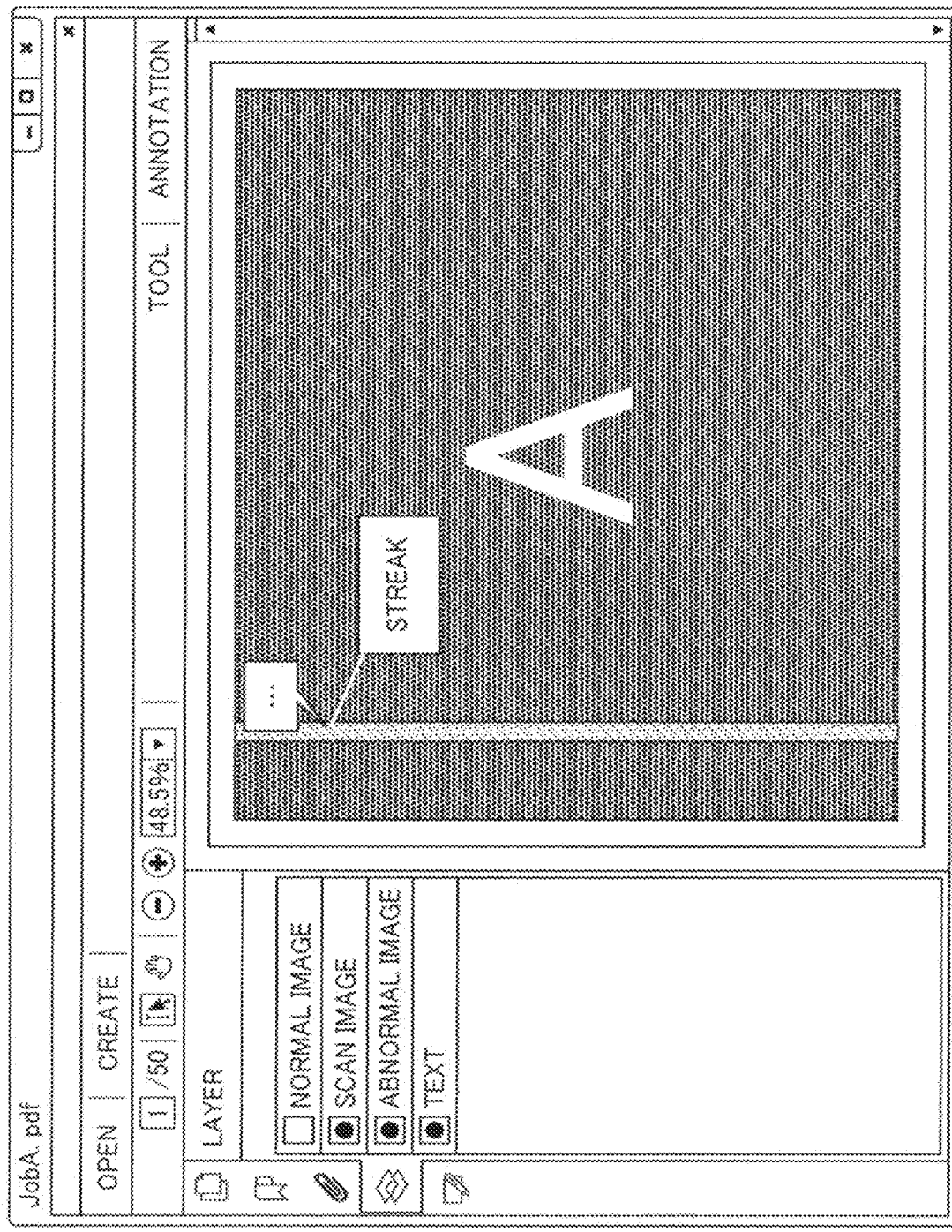
FIG. 10D shows an example of the display screen displaying an error name text embedded by note annotation.

When an error name text is embedded by utilizing note annotation, as shown in FIG. 10D, (i) a balloon mark indicating that note annotation is utilized to embed the error name text and (ii) the error name text of, in this case, the streak can be displayed.

As described above, the image forming apparatus 1 includes: the image forming unit 18 which forms an image on a sheet; the image reading unit 19 which reads a sheet face on which the image is formed, thereby generating a scan image; the image inspecting unit 20 which compares the generated scan image with a normal image to detect an error(s) in the scan image; and the history generating unit 21 which, when the image inspecting unit detects the error(s), generates detection information on the detected error and embeds the generated detection information in the scan image, thereby generating a history image.

By reading the detection information embedded in the history image, one or more errors detected in the scan image can be easily retrieved. Further, an application supporting the file format which can embed and read texts and images can be utilized to embed and retrieve the detection information. Thus, there is provided a history image which makes it easy to confirm error detection information without a dedicated application to confirmation of the error detection result.

The above embodiment is a preferred example of the present invention. The present invention is not limited thereto and can be appropriately modified within the scope not departing from the spirit of the present invention.

In the above embodiment, a PDF history image is generated. However, the file format of the history image is not limited to PDF and may be any as long as it can embed and read texts and images. A file format using a structured language which adds meta-information (metadata) by tags can embed and read texts and images. Hence, for example, file formats such as HTML and OOXML can also be utilized.

As a computer readable medium storing therein the program(s) to perform the procedure shown in FIG. 3, a nonvolatile memory such as a ROM or a flash memory or a portable storage medium such as a CD-ROM can be used. Further, as a medium to provide data of the program(s) via a communication line, a carrier wave can be used.

This application is based upon and claims the benefit of priority under 35 U.S.C. 119 of Japanese Patent Application No. 2015-021729 filed on Feb. 6, 2015, the entire disclosure of which, including the specification, claims, drawings and abstract, is incorporated herein by reference in its entirety.

What is claimed is:

1. An image forming apparatus comprising:
an image forming unit configured to form an image on a sheet, the image being formed based on a target image;
an image reading unit configured to read a sheet face on which the image is formed and generate a scan image based on the read sheet face;
an image inspecting unit configured to compare the scan image with the target image to detect an error in the scan image; and
a generating unit configured to generate a modified image by: (i) converting the scan image to one of Portable Document Format (PDF), Hypertext Markup Language (HTML), and Office Open eXtensible Markup Language (OOXML); and (ii) when the image inspecting unit detects the error, embedding error information regarding the detected error in the scan image as a layer different from a layer of the scan image.

2. The image forming apparatus according to claim 1, wherein the generating unit generates an error name text of a name of the error as the error information and embeds the generated error name text in one or more rectangular regions containing an error-detected image region, where the error is detected.

3. The image forming apparatus according to claim 2, wherein the name is composed of one of or any combination of (i) a type, (ii) an identification number and (iii) a level of the error.

4. The image forming apparatus according to claim 2, wherein the generating unit determines one rectangular region circumscribing the error-detected image region as a text embedment region, where the error name text is to be embedded, and determines a format and a layout of the error name text such that a size of the text embedment region agrees with a size of the error name text when embedded in the text embedment region.

5. The image forming apparatus according to claim 2, wherein the generating unit determines one or more rectangular regions placed over the error-detected image region as one or more text embedment regions, where the error name text is to be embedded, and determines a format and a layout of the error name text such that a size or sizes of the one or more text embedment regions agrees with a size of the error name text when embedded in the one or more text embedment regions.

6. The image forming apparatus according to claim 2, wherein the error name text has a transparent color.

7. The image forming apparatus according to claim 2, wherein the generating unit generates a bookmark using the error name text and embeds the generated bookmark in the scan image.

8. The image forming apparatus according to claim 1, wherein the generating unit generates an image clearly showing an error-detected image region, where the error is detected, as the error information.

9. The image forming apparatus according to claim 8, wherein the generating unit generates, as the image clearly showing the error-detected image region, at least one of (i) an image accentuating the error-detected image region and (ii) an image of the error-detected image region placed on the normal image.

10. The image forming apparatus according to claim 1, wherein the image inspecting unit detects the error of at least one type among an image defect, a color shift and a position shift.

11. The image forming apparatus according to claim 1, wherein the generating unit determines one or more rectangular regions as one or more text embedment regions, where the error information is to be embedded, each of said one or more rectangular regions corresponding to a part of the whole scan image.

12. The image forming apparatus according to claim 1, wherein the generating unit generates history images of a plurality of scanned images of a job and combines the history images of the plurality of scanned images of the job into a history image of the job.

13. The image forming apparatus according to claim 12, wherein the generating unit generates a bookmark using the error information of the plurality of scanned images of the job and embeds the bookmark in the history image of the job, the bookmark configured to hierarchically display and link the error information to the plurality of scanned images such that selection of particular displayed error information causes the corresponding scanned image to be displayed.

14. A method comprising:
forming an image on a sheet based on a target image;
reading a sheet face on which the image is formed and generating a scan image based on the read sheet face;
comparing the scan image with the target image to detect an error in the scan image;
converting the scan image to one of Portable Document Format (PDF), Hypertext Markup Language (HTML), and Office Open eXtensible Markup Language (OOXML); and
when the error is detected, embedding error information regarding the detected error in the scan image as a layer different from a layer of the scan image to generate a modified image.

15. The method according to claim 14, further comprising determining one or more rectangular regions as one or more text embedment regions, where the error information is to be embedded, each of said one or more rectangular regions corresponding to a part of the whole scan image.

16. The method according to claim 14, further comprising generating history images of a plurality of scanned images of a job and combining the history images of the plurality of scanned images of the job into a history image of the job.

17. The method according to claim 16, wherein the generating unit generates a bookmark using the error information of the plurality of scanned images of the job and embeds the bookmark in the history image of the job, the bookmark configured to hierarchically display and link the error information to the plurality of scanned images such that selection of particular displayed error information causes the corresponding scanned image to be displayed.

18. An image forming apparatus comprising:
an image forming unit configured to form an image on a sheet, the image being formed based on a target image;
an image reading unit configured to read a sheet face on which the image is formed and generate a scan image based on the read sheet face;
an image inspecting unit configured to compare the scan image with the target image to detect an error in the scan image; and
a generating unit configured to generate a modified image by: (i) converting the scan image to one of Portable Document Format (PDF), Hypertext Markup Language (HTML), and Office Open eXtensible Markup Language (OOXML); and (ii) when the image inspecting unit detects the error, digitally embedding error information regarding the detected error in the scan image.

19. The image forming apparatus according to claim 18, wherein the error information is embedded in a PDF file, an HTML file, or an OOXML file corresponding to the scanned image.

20. The image forming apparatus according to claim 18, wherein electronic data corresponding to the error information is embedded in the scan image.

* * * * *